United States Patent [19]

Stokes

[11] Patent Number: 4,697,173
[45] Date of Patent: Sep. 29, 1987

[54] LOAD SENSING ALARM CONDITION MONITOR

[76] Inventor: Dale R. Stokes, P.O. Box 58, Mingenew, Australia

[21] Appl. No.: 721,578

[22] Filed: Apr. 10, 1985

[30] Foreign Application Priority Data

Apr. 10, 1984 [AU] Australia ............................ PG4507

[51] Int. Cl.$^4$ ............................................ G08B 21/00
[52] U.S. Cl. ........................................ 340/684; 111/1; 340/521; 340/671
[58] Field of Search ...................... 340/684, 679, 521; 111/1, DIG. 1

[56] References Cited

U.S. PATENT DOCUMENTS

| | | | |
|---|---|---|---|
| 4,053,868 | 10/1977 | Cox et al. | 340/521 |
| 4,100,538 | 7/1978 | Knepler | 111/1 |
| 4,185,224 | 1/1980 | Thompson | 340/684 |
| 4,238,790 | 12/1980 | Balogh et al. | 111/1 |
| 4,296,409 | 10/1981 | Whitaker et al. | 340/684 |

Primary Examiner—Glen R. Swann, III
Attorney, Agent, or Firm—Harness, Dickey & Pierce

[57] ABSTRACT

A monitoring means for apparatus having a number of functional stations, said means comprising a plurality of sensors or groups of sensors located to monitor the operation of at least some of said functional stations, each sensor having a critical condition indicator adjacent the respective station, a central monitor having a power supply connected via a common connection to each of the sensors and a common signal line connected to the output of each of said sensors wherein each sensor provides an output on activation of the critical condition indicator, said central monitor having an alarm means activated through said signal line wherein each sensor and/or group of sensors provides an output signal to said signal line characteristic of said sensor or group of sensors to cause the alarm means to be activated in a manner characteristic of said sensor or group of sensors.

13 Claims, 22 Drawing Figures

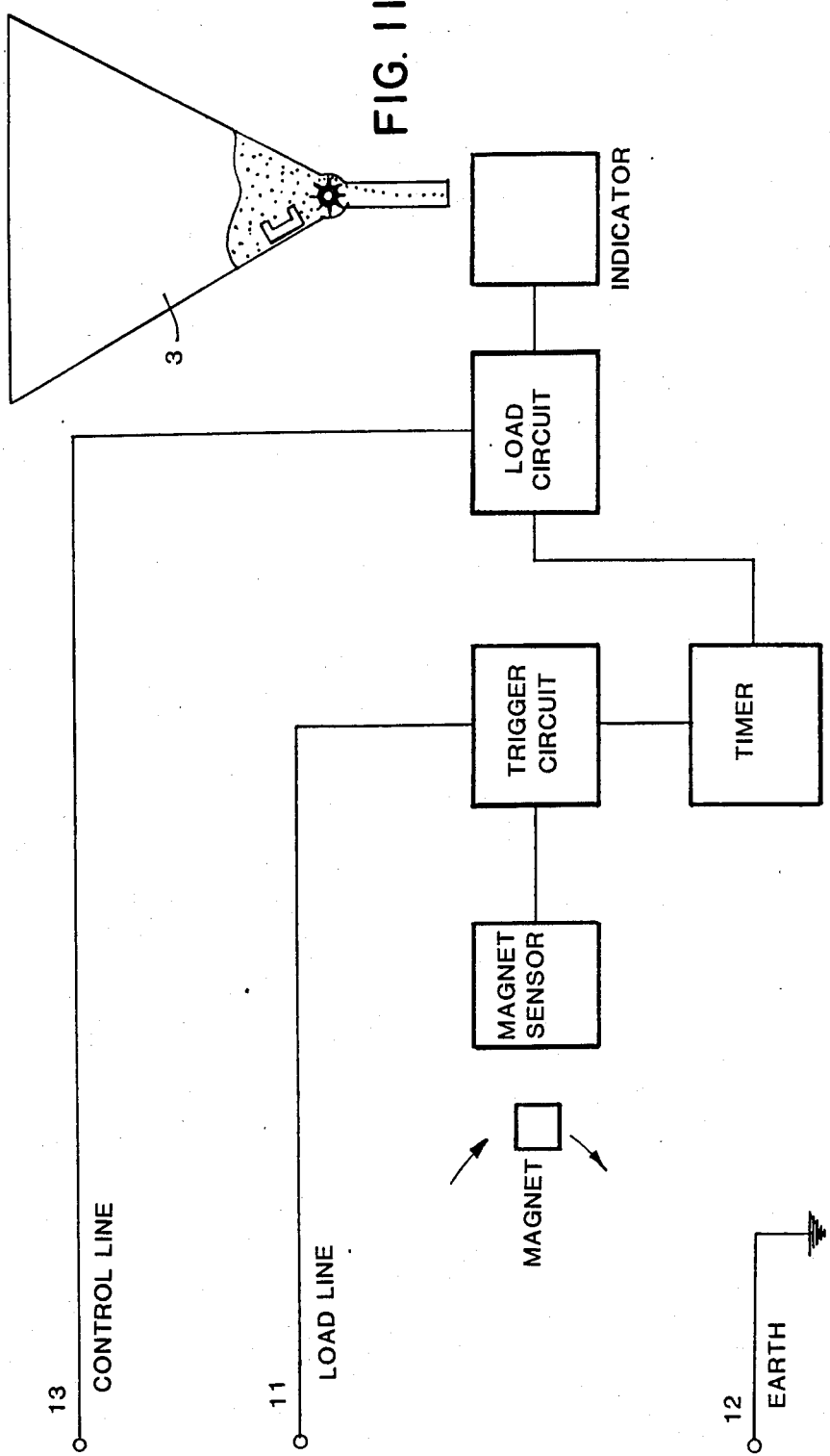

LOAD SENSING ALARM CONDITION MONITOR

This invention relates to a monitoring means.

In one form the invention resides in a monitoring means for apparatus having a number of functional stations, said means comprising a plurality of sensors or groups of sensors located to monitor the operation of at least some of said functional stations, each sensor having a critical condition indicator adjacent the respective station, a central monitor having a power supply connected via a common connection to each of the sensors and a common signal line connected to the output of each of said sensors wherein each sensor provides an output on activation of the critical condition indicator, said central monitor having an alarm means activated through said signal line wherein each sensor and/or group of sensors provides an output signal to said signal line characteristic of said sensor or group of sensors to cause the alarm means to be activated in a manner characteristic of said sensor or group of sensors.

According to a preferred feature of the invention said apparatus includes an operational sensor for providing a signal proportional to the rate of operation of at least one functional station wherein the output of said operational sensor is connected to said signal line and said central monitor is provided with a discrimination circuit capable of discriminating the output signal of said operational sensor to provide a measure of the operating characteristics of said station.

According to a further preferred feature of the invention said central monitor has means to selectively lock at least some of said sensors into an output condition which exits at any desired time.

According to a further preferred feature of the invention said central monitor has a means of selectively cancelling the operation of one or more of said sensors for a predetermined period of time.

One particular application of the invention resides in sensing the operating status of agricultural seeding apparatus. Such apparatus could be divided into two catogories to simplify description of their seeding principle. Firstly, what would be best described as conventional seeders consist of a hopper or hoppers the full sowing width of the machine and placed directly above the seeding drop tubes. The seed and fertilizer is then mechanically metered from the hopper or hoppers into the drop tube where gravity causes it to travel down the tube and exit at the required row spacing.

Secondly, air seeders utilize pressurized air to convey material through a plurality of passages and depart substantially from the more conventional means of sowing seeds. An air seeder usually consists of a separate narrower hopper or hoppers with one main metering system metering the material into one main passage from which the material is transported by pressurized air usually supplied by a contrifical air blower. From this main passageway the material is conveyed to a separate cultivating implement where it is divided into smaller but more numerous passages so as to result in the required number of individual seeding drop tubes. These dividing points are commonly referred to as splitter heads. These drop tubes direct the seed to the ground with the required spacing similar to a conventional seeder. It should be noted that this is a basic air seeder principle and there is some variation between individual makes of machines. A notable variation being the use of more than one metering device at the hopper or hoppers and more than one associated main passage. However, even with this variation the main passageways conveying the metered material are still split or divided into individual drop tubes to exit at the required row spacing. These are all well known principles to those who are skilled in the state of the art.

With either type of seeding apparatus a relatively high number of moving parts are required to carry out the desired function of the machine. These machines are subjected to severe environmental conditions including dust, moisture, corrosion, vibration, temperature and the like which along with normal wear and tear can cause unexpected malfunctions within the machine. With the present day trend to much larger machinery and a requirement for greater efficiency to help offset rising costs it has become essential but increasingly difficult for the operator to satisfy himself that the machine is seeding in a satisfactory manner. Also, with the need for night time working with modern farming methods it is completely impossible for the operator to have any chance of detecting a malfunction without having to stop and constantly check his machine which is inconvenient and results in lost productivity. Failure to detect a malfunction will also lead to costly loss production by leaving areas unsown.

For these reasons it is obvious that with the large complex machinery presently being used some form of reliable monitoring or warning system will greatly help the operator of such seeding machinery to achieve the efficiency which is required to meet present day demands.

It will be appreciated that any such monitoring device will have to exhibit a high degree of reliability, preferably be of a simple design, be capable of monitoring all required functions without increasing complexity of wiring which ideally should be kept to a minimum and possibly most important be easily understood by non-technical personal to eliminate costly repairs for the farmer. Expandability of the system to meet the farmer's future requirements would be an added advantage.

A monitor that would give the operator immediate warning of a malfunction and to be practical would have to be of electronic design. Although electronics solves most problems of how to build a suitable monitor, agricultural machinery is a most unsuitable place for this type of equipment. Electronic equipment fitted to seeding machinery will suffer the worse kind of abuse imaginable. It is constantly exposed to the weather, sever dust, corrosion from fertilizers, vibration and suffers a high risk of physical damage. Wires and connectors are particularly prone to these problems. There is no real solution to connector problems as good quality cadium plated types are subject to corrosion from nitrogenous type fertilizers rendering them useless after a season or two. Rubber sealed types will perish from exposure to sunlight and like cadium plated connectors they will be difficult to disconnect and invariably result in the wire being pulled from the connector. As the equipment is not likely to receive the dedicated attention and preventative maintenance normally attributed to electronic equipment by personal skilled in electronics, the monitor will soon fall into a state of disrepair.

Even repairs if carried out, present a problem as moisture tends to creep along the inside of plastic covered wiring oxidizing its surface for quite some distance, making it difficult to resolder connections. It is not uncommon for wiring to be pulled apart by foreign objects lying in the field becoming entangled with the wires. If a great many wires are contained within the cable it can be quite a formittable task to repair such damage. Also with such cables a tractor operator forgetting to disconnect the cable from the tractor when disconnecting the tractor from the implement could render the monitor useless. As time is money during the sowing operation difficult repair problems of this nature are invariably left to receive attention during the preparation period before the next sowing season with the result that the farmer will be forced to continue his sowing operation without a monitor.

The most effective answer to these problems is to design a monitor to use inexpensive connectors and commonly available wires so that the connectors can be disgarded and the wire easily shortened and repaired to take a new connector should it be required. With such a system should no connectors be available twisting of the wires together and tapping would be desirable. By using commonly available three conductor cables any damage incurred as discussed above will be a relatively simple matter to repair.

In the case of seeding machines the aspects requiring monitoring would be the presence of or lack of material flowing in the tubes, the detection of failed mechanical actions such as shaft rotation, indication of low bin or hopper levels and a clock to indicate the area shown.

With tube monitoring one sensing device per tube is required for complete monitoring of the seeding function. The operator may elect to only monitor a few tubes at randum as a guide to how the machine is functioning. However, if he should require a complete monitoring of all drop tubes it will be necessary to fit sensors to every down tube. On wide machinery as used in most broadacre farming today the fitting of sensors to every down tube can result in as many as one hundred or more semsors.

With an air seeder it is in most cases more practical to monitor only the final splitter heads prior to the drop tubes as this will usually give sufficient indication. But even in this case upwards of ten sensors will be required.

Various types of monitors have been disclosed for monitoring seeders but often are only suitable for use with a relatively low number of sensors i.e. less than ten. The object of these monitors is to automatically indicate to the tractor driver that there is a sowing irregularity. The driver eliminates the disturbance then continues with the seeding. It is a common characteristic with these monitors to fit a sensing device on each of the drop tubes to be monitored then channel two conductors per sensor from the sensor some distance to a master fault location indicating unit that is placed in the view of the tractor operator usually in the tractor cabin. With such units a warning is usually provided of an irregularity by a light or audible device such as to indicate the presence and location of a fault.

As mentioned above there are twice as many lines or conductors for carrying the information from the sensors fitted to the drop tubes as there are indicators providing individual information at the sensor unit. For example if ten sensors are fitted there will be twenty conductors to convey the information to the indicating unit. Such wires or conductors can be bundled into a multi wire cable or a composite cable to assist in the management of so many wires. But this results in a costly cable and an expensive complicated connector for joining the cable at the rear of the tractor. It will be realized that any further increase in the number of sensors fitted with result in a totally impractical and unmanageable number of wires having to be used. The need for alternate sensors for bin and shaft monitoring for example will further compound this problem.

Such a cable would be subject to a higher incidence of damage because of its complexity, would be difficult to route from the machine to the tractor, would require expensive connectors, would consist of a substantial amount of cable and would be very difficult to repair in the event that it was damaged. The operator will also experience difficulty in memorizing the fault location if many sensors are fitted as the indicator number has to be noted then the sensors counted off to locate the fault. Therefore, the use of solutions as mentioned so far on relatively large machinery could be considered quite impractical.

There has been several attempts to solve this problem.

The basic aim of these attempts has been to reduce the complexity or the number of wires that are required to be connected to the tractor control unit. Whilst the number of wires has been considerably reduced (5) in total it has been at the expense of increased complexity of the wiring fitted to the seeding machine, this of course is the main area subject to moisture, dust and possible damage. This method also has increased the required number of connections which have to be made on the machine, greatly increasing the cost and the possibility of malfunction due to corrosion at these points. Another major draw back is the use of separate sensing devices such as piezo transducers and the fault indicating circuit module. The voltage and current generated by transducers is of a relatively low nature and is greatly subject to the effects of moisture on its path to its relevant switch circuit.

In summary these attempts reduced the machine to tractor wiring problem but have done so at the expense of increased wiring required to be fitted to the machine creating the problems as discussed above.

A partial solution to the above problem has been suggested in No. GB2088603A whereby a number of sensors are grouped together to provide a common output to the sensor. This solution however still presents the disadvantages referred to above although possibly on a smaller scale, however in addition it raises the problem that on a fault being signalled one must check each component of the group to determine which one is faulty.

In addition all of the prior art devices referred to above provide a signalling means at the operators station only, which can present a difficulty where a large number of sensors are used, in that the operator must remember the sensors which are providing the output before leaving the operators station.

It is an object of the invention to simplify the electrical interconnection between the sensors and the monitor to facilitate installation and repair by operators not being trained as electricians.

It is a further object of the invention to provide for signalling of a sensor output both at the monitor at the sensor.

In another form the invention resides in a monitoring means for an agricultural seeding apparatus having a number of seed delivery conduits, said monitoring means comprising a plurality of sensors located to monitor the flow of material through said conduits, each sensor having a critical condition indicator adjacent the respective station, a central monitor having a power supply connected via a common connection to each of the sensors and a common signal line connected to the output of each of the sensors wherein each sensor provides an output on activation of the critical condition indicator, said central monitor having an alarm means activated through said signal line wherein each sensor provides an output signal to said signal line characteristic of said sensor to cause the alarm means to be activated.

According to a preferred feature of the invention a plurality of sensor types are provided whereby each sensor type provides a signal characteristic of said sensor type to cause the alarm means to be activated in a manner characteristic of said sensor type.

The invention provides a monitoring means which is capable of high reliability and yet is of simple design and is capable of monitoring a large number of functions some of which are of differing types, with the minimum of electrical wiring between the sensors and the monitor.

In addition the electrical wiring of monitoring means may be readily repaired by non-skilled personal. Further-more the system can be readily expanded without any modification to the monitoring means.

The invention will be more fully understood in the light of the following description of one specific embodiment. The description is made with reference to the accompanying drawings of which:

Figure 3A:
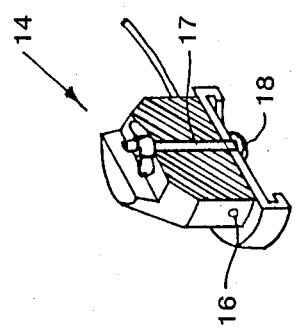
Figure 4:
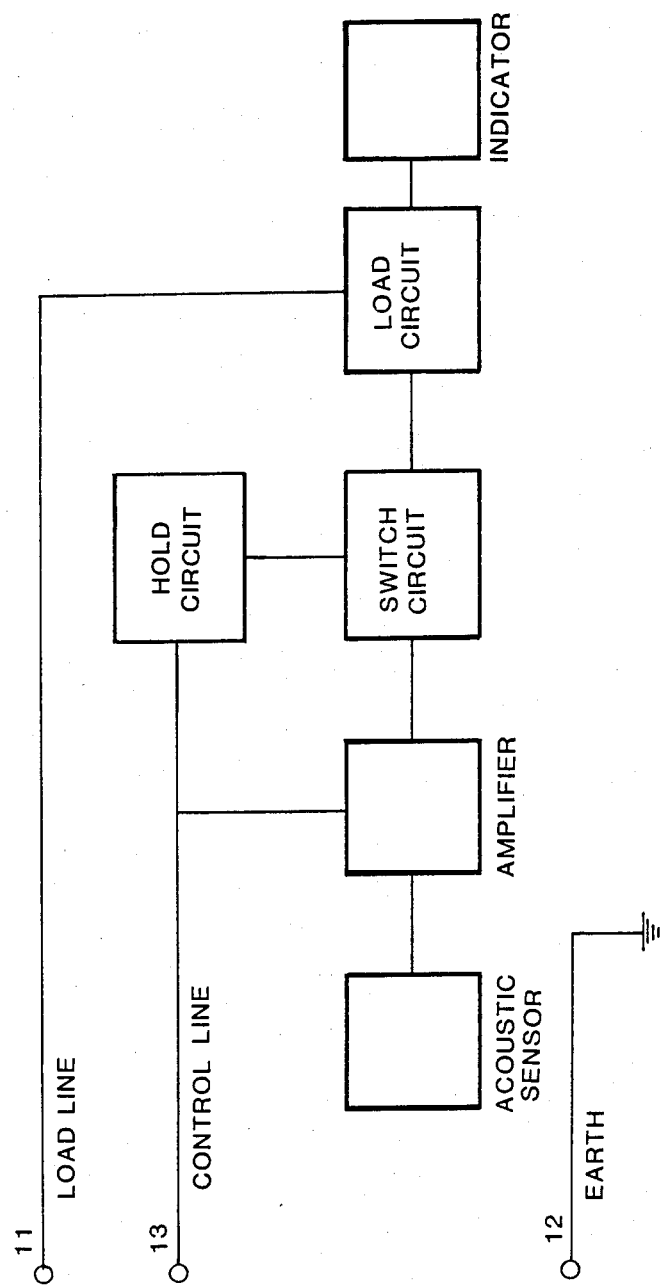
Figure 5A:
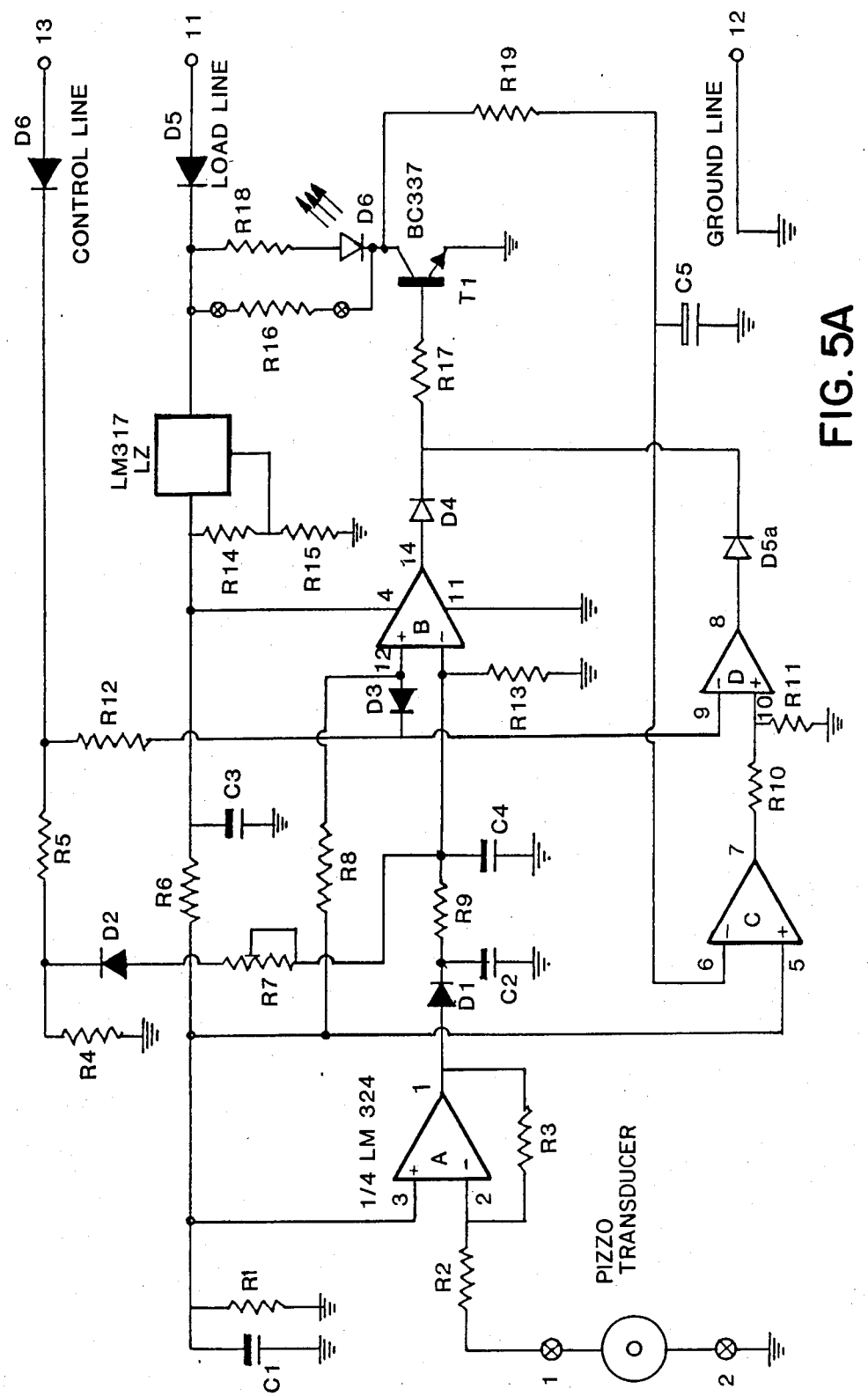
Figure 5B:
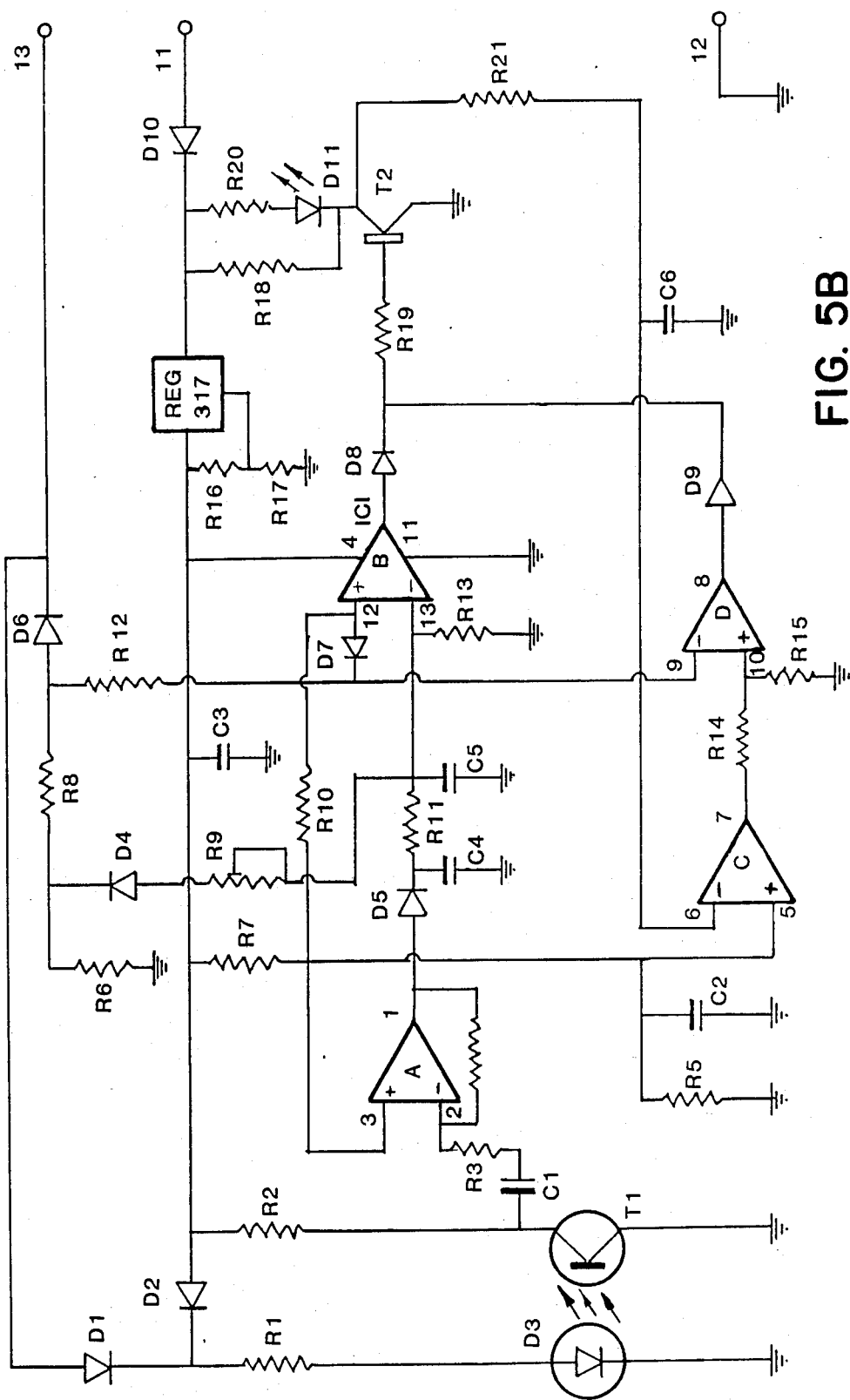
Figure 6A:
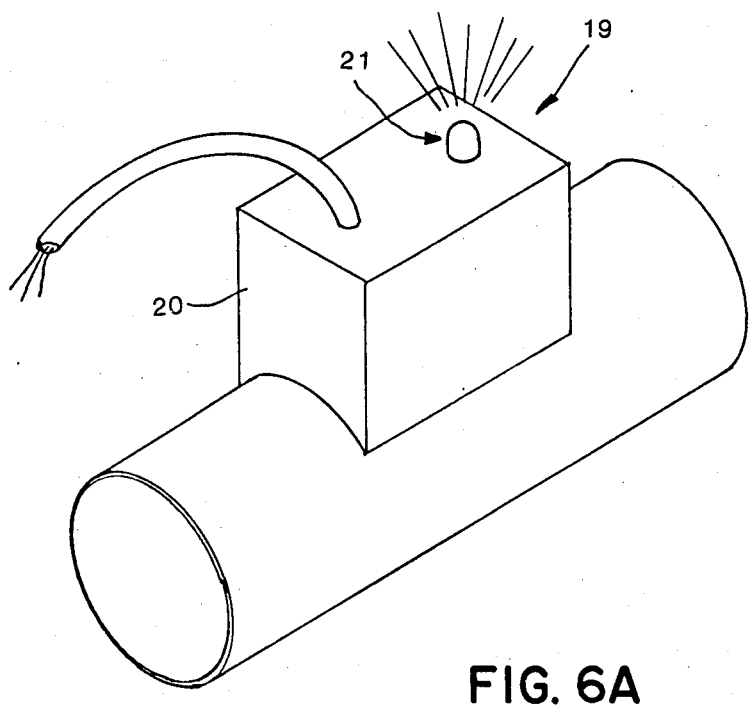
Figure 6B:
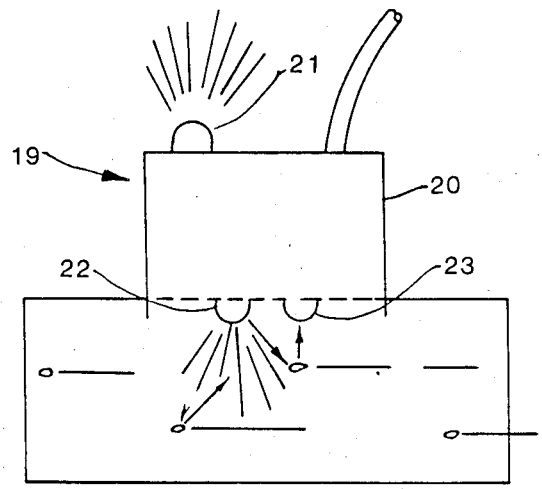
Figure 6C:
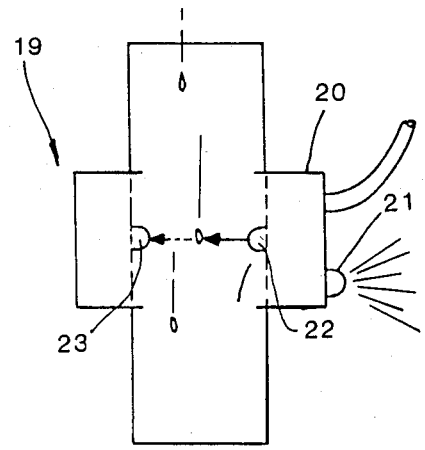
Figure 7:
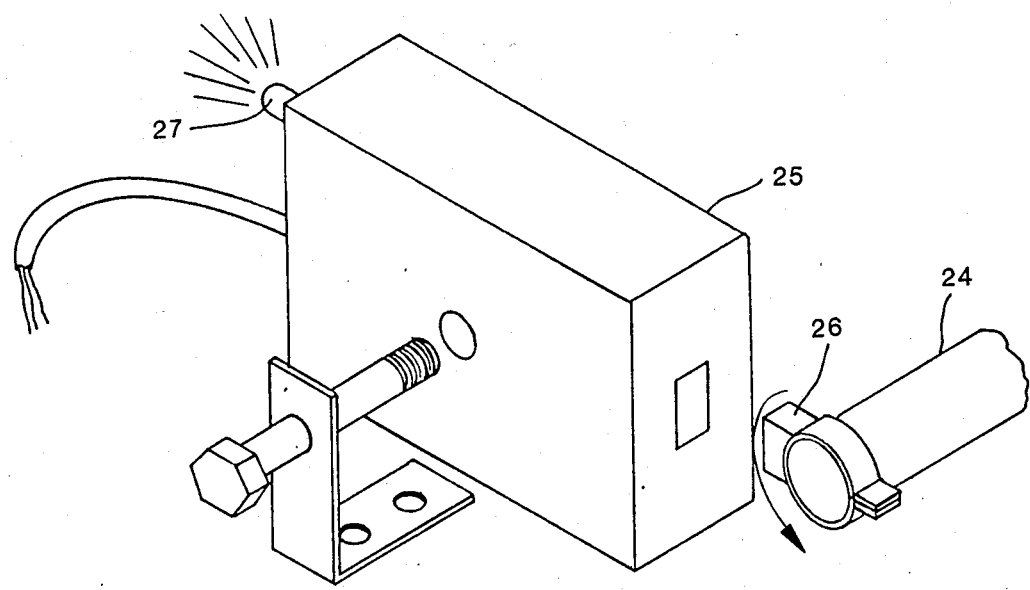
Figure 10B:
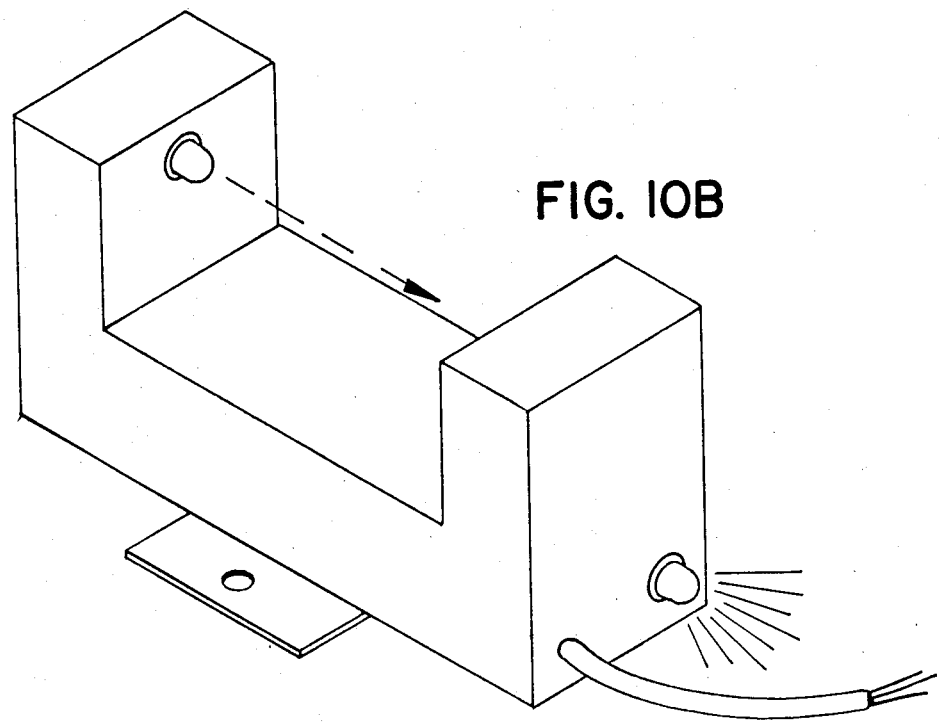
Figure 10A:
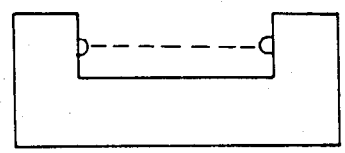
Figure 8:
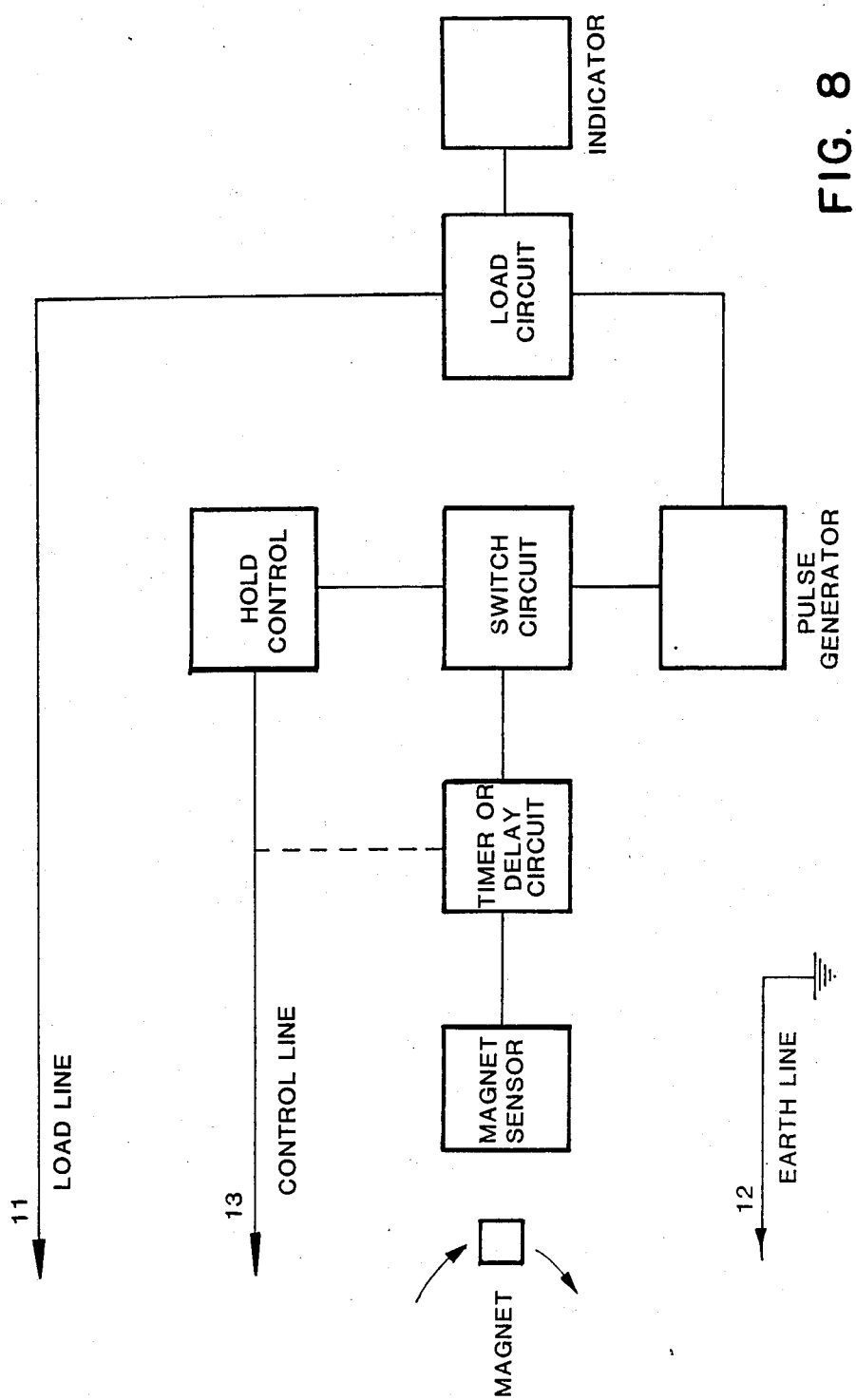
Figure 9:
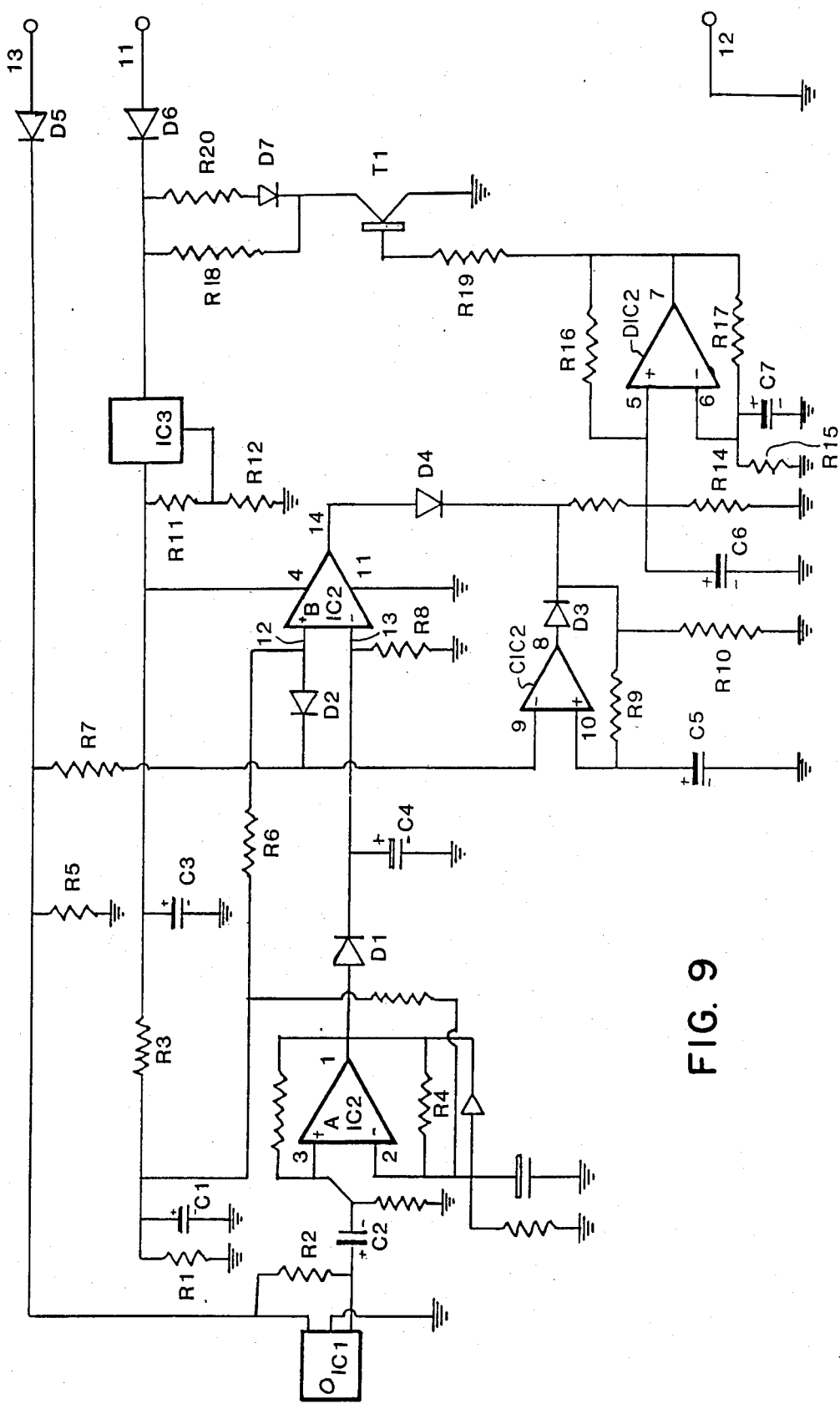
Figure 12:
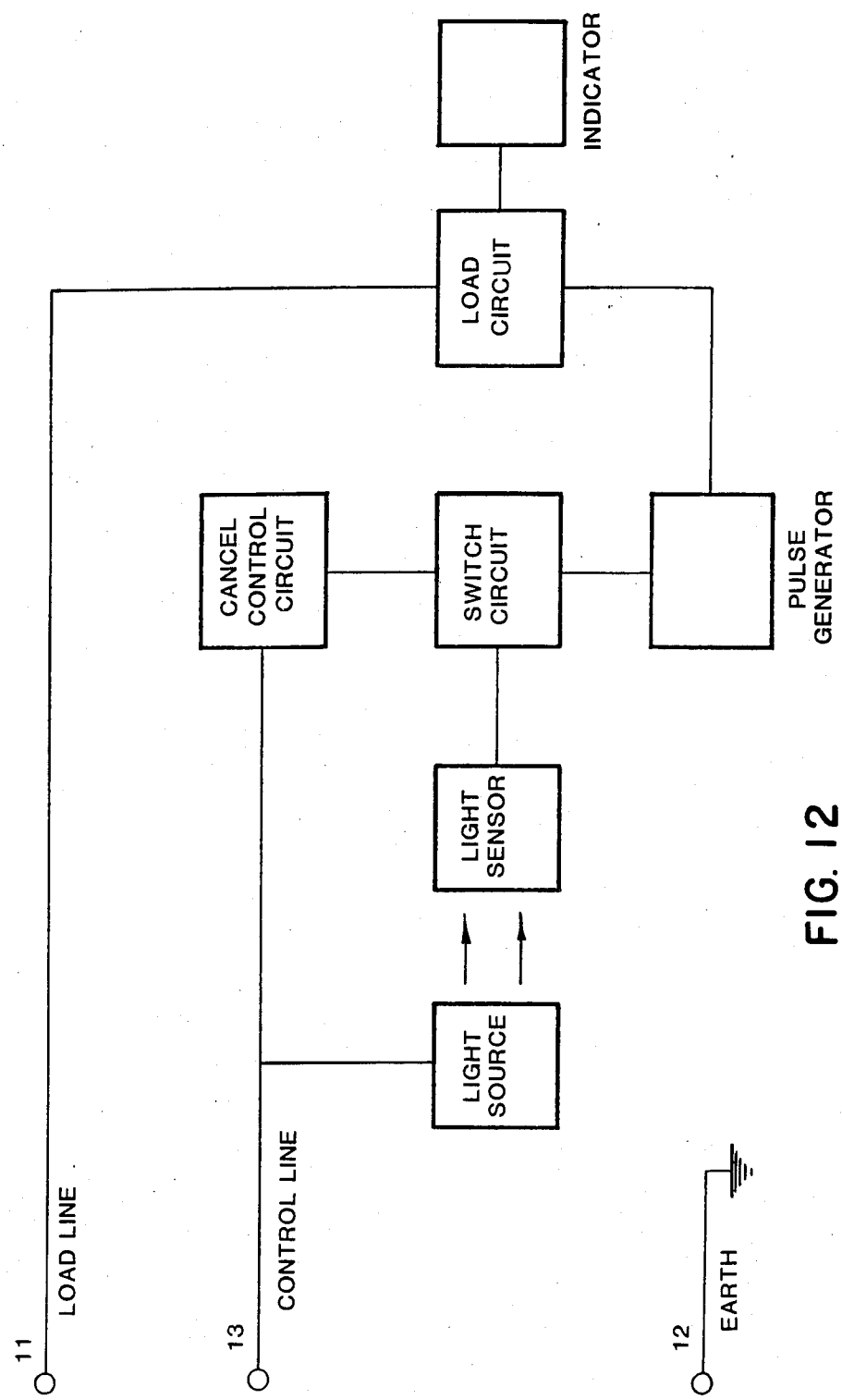
Figure 13:
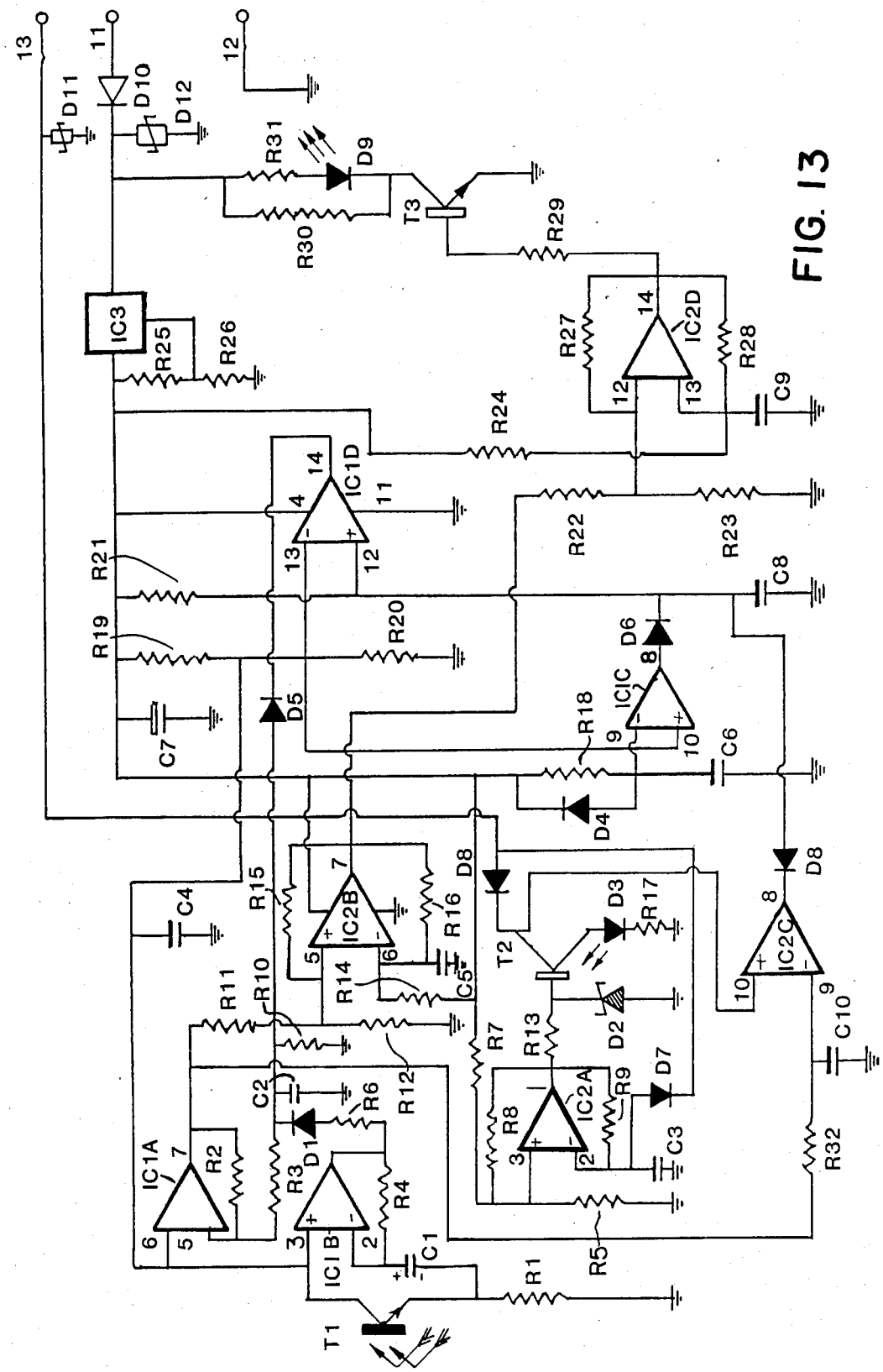
Figure 15:
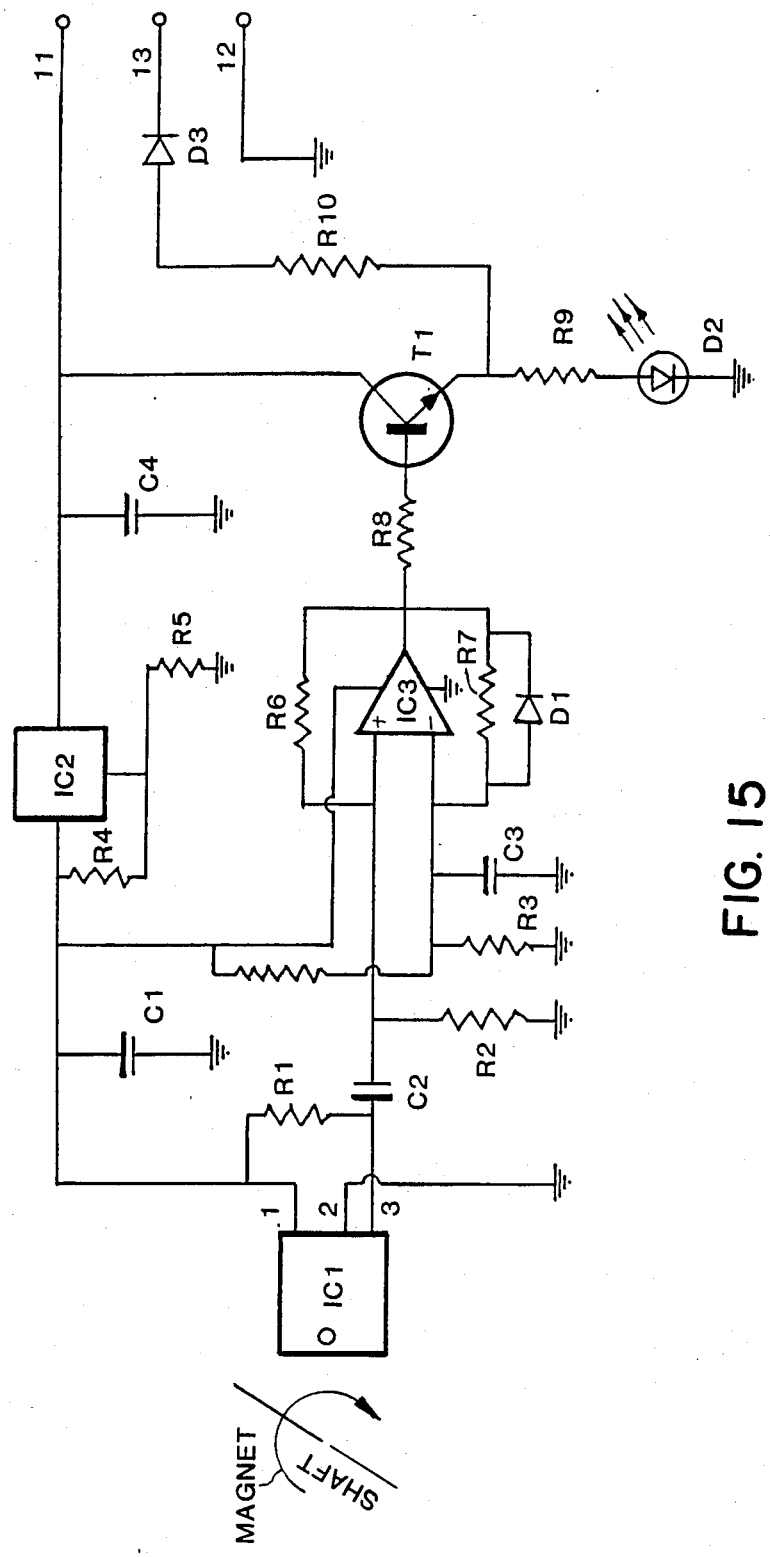
Figure 16:
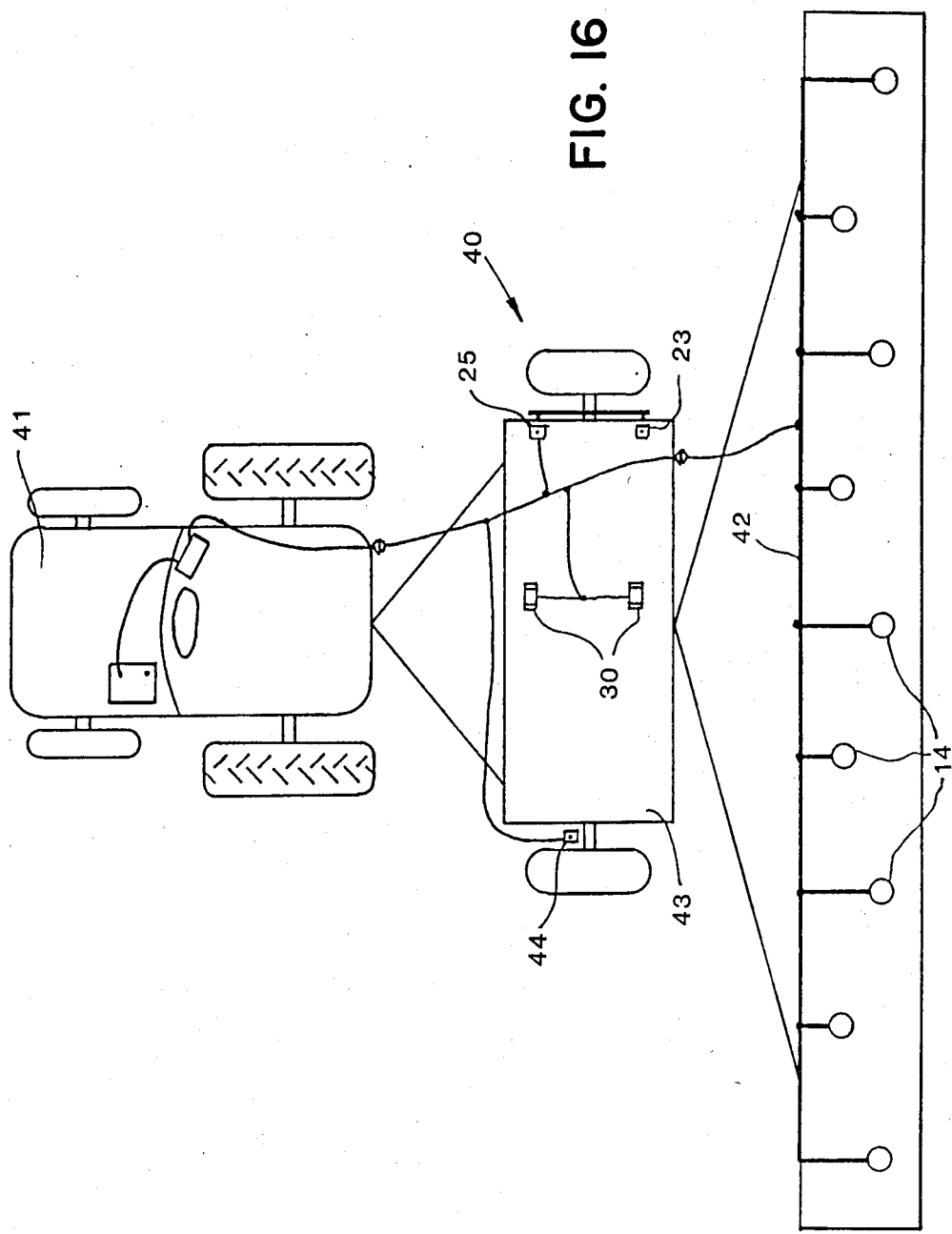
Figure 17:
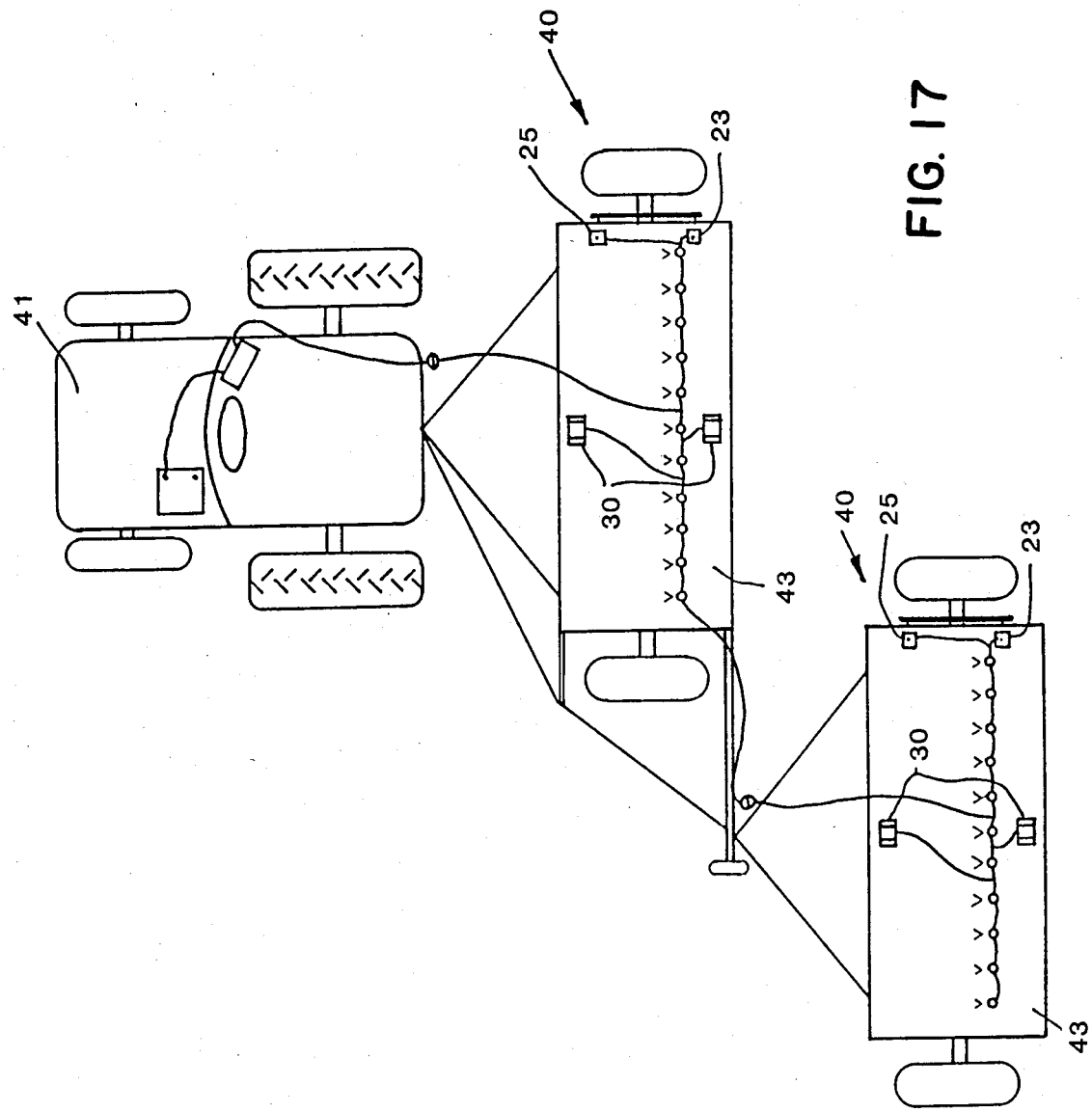

FIGS. 3A and B are various views of a flow line sensor;

FIG. 4 is a schematic block circuit diagram for the flow line sensors;

FIG. 5a is an example of a circuit utilising an accoustic sensor which is suitable for the block circuit of FIG. 4;

FIG. 5b is an example of a circuit utilising an infra red sensor which is suitable for the block circuit of FIG. 4;

FIGS. 6A, B & C are various views of an alternative form of flow line sensors;

FIG. 7 is an isometric view of a rotational sensor according to the embodiment;

FIG. 8 is a block circuit diagram for the rotational sensor;

FIG. 9 is an example of an electrical circuit for the block circuit of FIG. 8;

FIG. 10A and 10B are various views of a level sensor according to the embodiment;

FIG. 11 is a schematic view of a bin with a level sensor installed;

FIG. 12 is a block circuit diagram for use with the level sensor; FIG. 13 is an example of an electrical circuit for the block circuit of FIG. 12;

FIG. 14 is a block circuit diagram for use with the one meter sensor;

FIG. 15 is an example of an electrical circuit of the block circuit of FIG. 14;

FIG. 16 is a schematic representation of the embodiment installed on an air seeder or tractor; and FIG. 17 is a schematic representation of the embodiment installed on a combine seeder.

Figure 1:
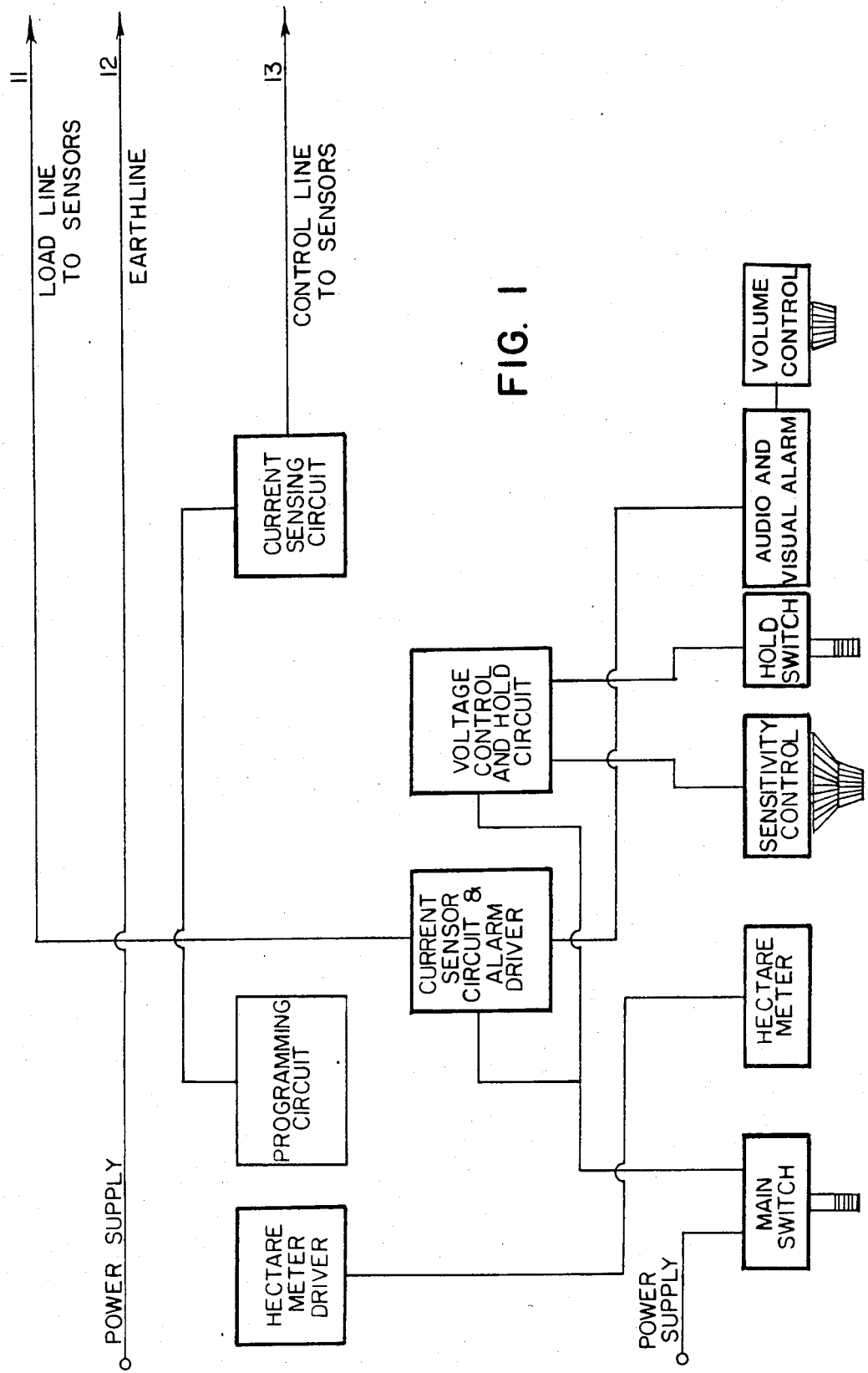
FIG. 1 is a schematic block circuit diagram of a central monitor according to the embodiment.

As shown at FIG. 16 the embodiment is directed towards a monitoring means for use with an air seeder 40 whereby the operation of the air seeder 40 may be monitored from the tractor vehicle by utilisation of a number of flow line sensors 14 located in the flow lines 42 of the seeder, at least one rotational sensor 25 associated with a drive shaft of the seed delivery means of the seeder, at least one level sensor 30 for indicating the level of material stored in the hopper 43 of the seeder and an operational sensor 44 for providing a measure of the rate of movement of the seeder over the ground. It is a feature of the embodiment that each of these sensors may provide the required signal to activate the central monitor through a common signal line and may be powered from said central monitor through a common power line. As a result there is a need for only three lines of electrical interconnection between all of the sensors and the central monitor. The central monitor (as shown at FIG. 1) is connected to each of the sensors via a load line 11 an earth line 12 by which the operation of the sensors is effected. The central monitor is further connected to each of the sensors through a control line 13.

Figure 2:
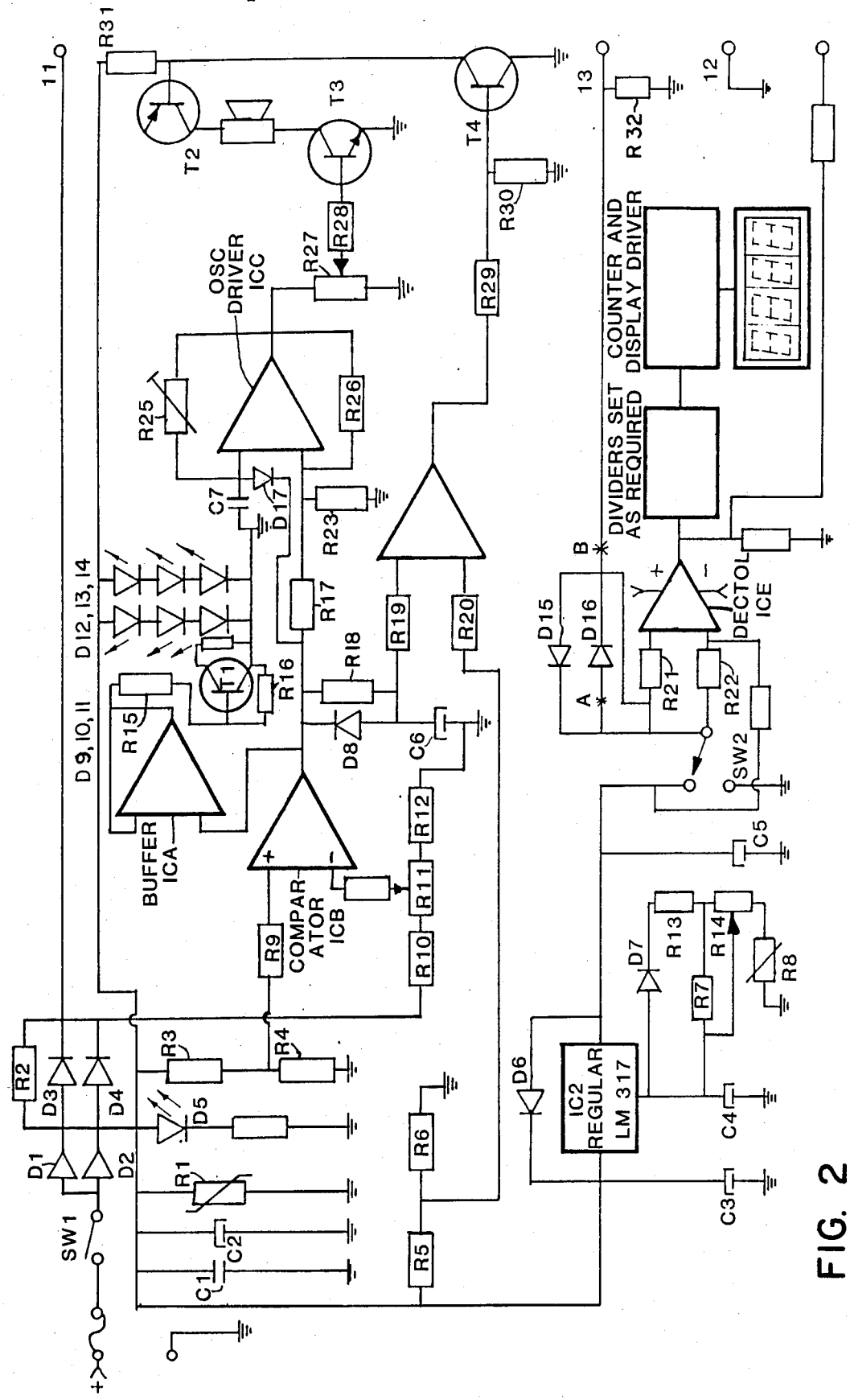
FIG. 2 is an example of a circuit suitable for the block circuit of FIG. 1.

An example of an electrical circuit which can be used for the central monitor is shown at FIG. 2 and consists firstly of an interference and high voltage spike protection circuit C1, C2, D1, D2 and R1 to protect the sensors from external interference or damage. The circuit indicates an integrated circuit (LM324) of which part A (ICA) functions as a buffer, part B (ICB) functions as a comparator, part C (ICC) functions as an oscillator driver and part D (ICD) functions as a timer.

A load sensing unit is formed by comparator ICB (¼ LM324) which has the non-inverting input connected to a voltage reference established by a resistor divider pair R3 and R4. The inverting output sensors a voltage via R10 and R11 which is proportional to the current through the load line terminal No. 11. R11 is used to adjust the trigger point of the comparator to operate at a pre-determined current on the loadline. D3 and D4 are placed across R2 so as to protect R2 from heavy currents such as short circuits. The comparator ICB (¼ LM324) is normally in the OFF condition but when the voltage drop across R2 reaches the preset level the comparator will toggle to the ON condition forward biasing T1 on via the buffer ICA. With T1 on current will flow through warning light LEDS D9, 10, 11, 12, 13, 14. The oscillator driver ICC (¼ LM324) will also be activated via R17 which will drive the warning piezo buzzer via T3 (R27 being a volume control). The timer ICD (¼ LM324) initially starts in the ON condition but after approximately 3 seconds C6 is charged via R18 to a higher potential than that between R5 and R6. As those potentials are applied to the non-inverting and inverting inputs respectively, the op amp will switch low after a short initial delay which will turn on T4 and T2 off thus disabling the warning buzzer. The net result of this action is to produce a warning system where the visual warning remains on and the audible systems only operate momentarily but do so each time the alarm is initated.

The control monitor also contains a voltage regulator circuit comprising or components IC2 (LM317 adjustable regulator) C3, D6, C4, D7, R7, R8, R13, R14 and C5 so as to provide a controlled voltage to apply to the control line for the purposes of controlling the sensors. R8 is for fine trimming and R14 the main voltage control or sensitivity control via the front panel. This voltage is applied via SW2 and D16 to control line terminal 13. SW2 is the HOLD switch and is switched to ground to apply zero voltage to the control line which will place the sensors on HOLD. ICE (½ LM358) is an op amp operating as a comparator to provide an output signal for the areameter. As power is supplied from the regulated circuit the potential at point A will be higher than at point B due to the forward potential difference across D15. When a signal pulse is transmitted via the areameter sensor a positive voltage is applied to the control line 33 which will exceed the voltage applied by the regulated circuit. This will reverse the potential difference between points A and B which will have the affect of driving the non-inverting input of the detector ICE high so as to cause it to change from a normally low state to a high state to produce an output signal. D15 is included to prevent the control line exceeding 0.7 of a volt above the normal control line voltage so as not to affect the HOLD characteristics of the sensors.

The output signal from ICE is either directed to an external areameter connection via R33 and terminal 10 or directed to a set of divider IC's such as 7492/74 LSF2 and a counter display drive IC MM74C926N which in turn drives a four digit display. These being well known circuit principles. The source of the signal for this information will be obvious from the following discussion of the area meter sensor.

The flow line sensors comprise a group of sensors associated with the flow lines of the seeder. The sensors shown at FIGS. 3A and B may comprise an accoustic sensor for providing an output indicative of the quantity of noise produced in the flow line by the passage of the seed therethrough as shown by the block circuit of FIG. 4. Each sensor is associated with an amplifier which provides an output to the control line 13 and also provides an output to an indicator associated with the sensor adjacent the sensor. The degree of sensitivity of at least some of the sensors is determined by the sensitivity control at the control monitor. The operation of each accoustic sensor is controlled by a hold circuit at said sensor which operates a switch circuit associated with the indicator and which is controlled through the control line from a hold switch at the central monitor. On activation of the hold switch the hold circuit activates the switch circuit of the sensor circuit to maintain the indicator in the state in which it existed just prior to activation of the hold switch.

An example of the sensor circuit is shown at FIG. 5a. The circuit Utilises an integrated circuit (LM324) having four parts of which part A (ICA) is used as an amplifier and part B (ICB), C (ICC) and D (ICD) are used as a comparator. Power is supplied to the voltage regulator on the load line 11 at 12–14 volts through reverse polarity protection diode D5. R14 and R15 set the regulator output voltage at 5 volts and are selected to reduce the regulator standby current to as low as possible, consistant with good regulation.

The output is fed direct to pin 4 of ICB of which is the IC's power supply and R6 and R1 form a voltage divider to create a voltage reference of 2.5 volts for pins 3 and 5 of A and C of the ICLM324 respectively, C1 and C3 filter the regulators output giving good noise immunity.

ICA operates as a audio amplifier to amplify the signal from the piezo transducer, R2 and R3 controlling the gain. D1 and C2 form a diode pump circuit and R9 and C4 smooth the resulting voltage developed before it is applied to pin 13 of a comparator Part B of the IC.

A variable voltage is supplied by the control line 13 to a resistor divider network comprising R4 and R5. The voltage developed at the junction of these two resistors is used to back bias diode D2 so as to provide a controlled drain current on the diode pump. R13 ensures some drain when the back bias is at a maximum, preventing current flow thus producing a lock up effect. Trimmer R7 is included to allow preset adjusting of each sensor circuit to a pre-determined level. The voltage developed by the pump is compared by the comparator ICB to a 2.5 volt reference supplied by R8 to pin 12.

The output of the comparator pin 14 drives transistor T1 via D4 and current limiting resistor R17. T1 switches the current which forms the load through R16 and R18—D6. D6 is a red LED which indicates when power is being drawn by T1. R16 is chosen to draw sufficient current to activate the master warning alarm E.

ICC comprises a comparator which has a 2.5 volt reference applied to pin 5 and compares this to T1's collector voltage applied to pin 6 and gives an inverted output on pin 7. R19 and C5 delay the action of comparator C. R10 and R11 halve the output of pin 7 and apply it to pin 10 of comparator D which is an alternate drive for T1 for when the unit is on HOLD. D4 and D5 form an OR gate.

When the unit is switched to HOLD the voltage on line 14 drops to zero and remains at 0.16 at the cathode of D4. Pin 12 of B drops to 0.6 volts lower than pin 13 which is at 1.8 therefore switching off comparator ICB. Pin 9 of comparator ICD will also drop to 0.16 volts so depending on the voltage on pin 10 which will be at either 2.5 or zero comparator ICD will either go high or low. For example if the indicator is on when the HOLD switch is operated the collector voltage on T1 will be close to zero so pin 6 will be lower than pin 5 of comparator ICC sending it high on pin 10, higher than pin 9, therefore causing comparator ICD to maintain transistor base drive. If alternatively the LED is off the collector voltage on T1 will be high and the opposite action will result for comparators ICC and ICD. The net result is that the LED will remain in whatever state it was in when the HOLD is operated whether there is input to amplifier ICA or not.

Diode D6 provides reverse polarity protection but mainly prevents pin 9 from going negative in relation to ground therefore preventing the circuit from holding in the off state. This will occur when a number of sensors are used in relation to line 13 at the sensor end of the wiring harness. Both the accoustic sensor and the infra red sensor are virtually identical except for the transducer. The accoustic sensor utilizes a piazo microphone and is directly coupled to the amplifier via R2.

If desired an infra red sensor may be used rather than an accoustic sensor. An example of a circuit utilising such a sensor is shown at FIG. 5b. The circuit also utilises an integrated circuit (LM324) having four parts of which part A (ICA) is used as an amplifier and parts B (ICB), C (ICC) and D (ICD) are used as comparators.

The infra red sensor utilizes a photo transistor and AC voltage is developed across C1 Light source diode D3 is supplied with current from the control line via D1 in the normal state so as to keep the current consumption on this line below the critical level required to activate the master warning alarm E. On switching the unit to HOLD line 2 goes to zero volts. Therefore to maintain a stable light source for T1 the alternate power supply to D3 via D2 takes over to power the LED thus maintaining a stable light source when switched to and from HOLD. The critical current consumption required to activate the alarms is now no longer of concern as the monitor system will be in the HOLD condition and the sensors frozen in their previous state. HOLD would normally only be used when a warning is received by the mastger warning alarms E. D3 and T1 are arranged so that light from D3 will fall on T1 and are arranged so that material passing the light source or sensor will cause variations in the level of light falling on T1. Without material flowing this light level will remain consistent. Variations in the light intensity will vary the current conducted by T1 through R2 causing an AC voltage to be developed across C1 and applied to amplifier ICA via R3.

Figure 3B:
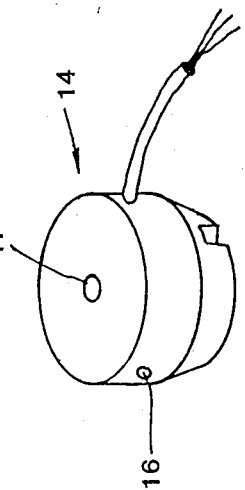

As shown at FIG. 3 the electronic components of the sensor 14 are placed in a plastic container which is filled with resin to form a solid waterproof body. The sensor 14 includes the LED indicator 16 and is formed with a passage 17 for a fixing bolt 18. The bolt serves the purpose of fixing the sensor in position and as a sound sensor in that material flowing through the flow line strikes the head of the bolt which is then sensed by the accoustic transducer.

If desired an infra red sensor may be of the form shown at FIGS. 6A, B and C. The infra red sensor 19 is mounted to a flow line and comprises a plastic housing 20 containing the electronic circuitry and which is filled with resin to form a waterproof body. An indicator LED 21 is mounted to the exterior of the body and a light source LED 22 adjacent infra red sensor 23 is located on the interior wall of the flow line.

The infra red sensor 23 comprises a photo transistor and may be used with the circuit shown at FIG. 5B whereby an AC voltage is developed by the sensor across C1. The light source LED 22 is supplied with current from the central line 13 via D1 in the normal state so as to keep the current consumption on the line below the critical level required to activate the master warning alarm E. The light source LED 22 and infra red sensor 23 are arranged so that light from the source will fall either directly or indirectly on the sensor and thus variations in the flow of material through the sensor will course variation in the intensity of light falling on the sensor.

In use upon the signal on any one of the flow lines sensors providing a signal indicating a condition of no or low flow through a flow line the audio and visual alarm (E) of the central monitor is activated while the indicator of the relevant sensor is also activated. By activation of the hold switch (D) the indicating condition of each of the sensors at the time of activation of the alarm may be locked in order that the operator may then examine each of the indicators and determine which of the flow lines is not operating satisfactorily. The output signal of the accoustic sensor and the infra red sensor are such that the alarm provided by the central monitor is of a continuous nature.

The rotational sensors sense the rotational state of a shaft associated with the seed delivery means of the airflow seeder (as shown at FIG. 7). The sensor may comprise a magnetic field or hall effect sensor 25 located beside a shaft 24 and associated with a magnet 26 affixed to this shaft. As shown at FIG. 8 the sensor is associated with a timer or delay circuit having an output to the control line 13 whereby upon there being a delay greater than a predetermined value between the receipt of two consecutive signals from the magnetic sensor an output is provided to the load line 11. The sensor is further associated with an indicator LED 27 located adjacent the sensor and associated with a pulse generator to provide an output signal to the indicator of a pulsing nature. In addition the pulse generator provides a pulsing signal to the load line 11 whereby upon activation of the audio and visual alarms at the central monitor the resultant alarm is of a pulsing nature. If more than one sensor is used, each for a different shaft, it may be desirable to have each sensor provide a characteristic pulsing output. The sensor circuit is further provided with a hold control activated through the control line 13 through the hold switch (D) of the central monitor whereby on activation of the hold switch the current status of the indicator of all the sensors may be locked.

In use in the event of the degree of rotation of the shaft with which the rotational sensor is associated being insufficient, a pulsing output is provided to both the indicator of the sensor and the alarm of the central monitor causing both to pulse. On operation of the hold switch (D) of the central monitor the current status of the sensor at that time may be locked into position in order that the operator may confirm whether in fact the sensor has been operating. By use of a pulsing output the operator is able to discriminate between the signals of the rotational sensors and the flow line sensors.

A particular form of the circuit for the rotational sensor is shown at FIG. 9. The circuit utilises an integrated circuit (LM324) having four parts of which part A (IC2A) serves as a monostable, parts B (IC2B) and C (IC2C) serve as comparators and part D (IC2D) serves as an oscillator. The circuit also uses another integrated circuit IC1 (UGN 3040T) which serves as a magnetic digital hall effect sensor with its output terminal connected to pin 3 of IC2A (which is one generator of an operational amplifier LM324) via C2. When a magnet comes within range of the sensor IC1 its output pin will swing low then high again as the magnet moves away. This will deliver a pulse to pin 3 of mono stable IC2. The sensor supply line number 1 is connected to the monitor control line 13. By supplying IC1 with power from this line current consumption drawn by the load line terminal 10 is kept to a minimum. IC3 is connected to this line and supplies a regulated voltage for the op amp.

IC2A operates as a mono stable. When its pin 3 receives an input pulse from IC1, IC2 will drive its output terminal pin 1 high for a perset period of time. As pin 1 is connected to pin 13 of IC2B it will cause the voltage on pin 13 to exceed the voltage on pin 12 thereby causing pin 14 to go high. When in the high state pin 14 will supply power to a low frequency oscillator (1 cycle per second) which is built around IC2D. Pin 7 of IC2D when high will drive T1 into the saturated state thereby causing it to draw current above the critical level from the load line 11 through the load resistor R18 and the indicator diode D7 thereby activating the alarm at the master control unit in an intermittent manner characteristic of the sensor supplying the signal (for example operates alarms one second in two).

IC2C's function is to enable the operator to lock or place the circuit on HOLD so as to enable him to identify the sensor which originated the alarm signal. Normally stopping would cause all alarms to change to the activated state due to all shaft rotation having ceased and thus the flow of seed have ceased. Switching to HOLD first will hold the non-activated alarms in the off state and allow activated alarms to continue.

IC2C's output pin 8 is normally held low as the voltage on the control line 13 supplied by B7 exceeds the voltage on pin 10 of IC2C. When the sensor is placed on HOLD in the off state the voltage on pin 12 of IC2H goes low compared to pin 13 maintaining IC2B in the off state. As the voltage supplied to pin 10 of IC2C via R9 is low due to IC2B being in the off state the voltage remaining on pin 9 when the control line 13 is switched to hold will still exceed the voltage on pin 10 therefore maintaining IC2C in the off condition. As there is no drive to IC2D via R13 the sensor remains in the off state.

If the sensor is already activated when switched to HOLD IC2B still switches to the off state but ICC supplies the drive to IC2D. This is achieved as a result of the voltage being applied to pin 10 now being higher than pin 9 when the unit is switched to HOLD. IC2C will now be locked into this state maintaining the alarm signal until the voltage on the control line applied to pin 9 returns to a high state which will disable IC2C returning the sensor to its normal state.

The level sensors are located in the storage hoppers for the seed and fertiliser and are intended to provide an output to the central monitor upon the levels of material in the respective hoppers falling below a desired level. FIGS. 10A and B illustrate a form of level sensor while FIG. 11 schematically illustrates the mounting of the sensor in a bin or hopper. The level sensor comprises a U-shaped body 30 the central body of which accommodates the electronic circuitory and is filled with resin to form a waterproof body. The LED light source 31 and infra red sensor 32 are located on the opposed faces of the arms of the body to form a light path therebetween. The body also supports an indicator LED 33 which is mounted to be viewable from the outside of the bin. The body is positioned in the bin at a position level with the minimum desired level within the bin and such that the material will flow clear of the body.

A block circuit for the level sensor is shown at FIG. 12. The light sensor provides an output to the central monitor through the load line 11 and the indicator associated with the sensor. The output is driven through a pulse generator which provides an output to the load line and to the indicator representative of the sensor. In addition the sensor circuit is associated with a cancel control circuit which is operated from the hold switch (D) of the monitor whereby on activation of the sensor and resultant activation of the alarm (E) the operation of the hold switch (D) causes the cancellation of any further output from the light sensor for a predetermined period of time. By this means on the operator becoming aware of the condition of the hoppers of the air flow seeder can cancel the operation of the sensor associated therewith will allow the operator to be aware of the activation of the flow line and rotational sensors of the air seeder after that time.

An example of the electrical circuit of the level sensor is shown at FIG. 13. The circuit utilises four similar integrated circuit (LM317) each having several parts. One part of one circuit (IC1B) operates as an amplifier, three parts of another circuit (IC2A, IC2B and IC2C) operates as oscillators and the remainder operate as comparators. In the circuit IC1B generates a voltage at pin 5 of IC1A when a signal is received by T1. The rail connected to pin 6 of IC1A is held at half V reg. by a resistor voltage divider pair R19 and R20.

IC1A operates as a comparator. If pin 5 becomes positive in relation to pin 6 the output pin 7 goes high. This voltage is applied to pin 5 of IC2B via R11. When high this enables IC2B to operate as a low frequency oscillator (approximately 1 cycle every 2 seconds). R14 is includes in ensure it remains in the off state when pin 5 of IC2B is low.

When IC2B is oscillating it will enable a higher frequency oscillator (1½ cycles per second) IC2D via R22. IC2C oscillator will be in the on state for approximately 2 seconds in every 4. It is trimmed by component selection to produce the required output signal by switching a load on intermitantly through T3. By suitable selection of oscillator components R27, R28 and C9 two quite different signals are produced. R24 ensures the oscillator stays off when required. The remainder of the circuit is mostly related to the cancel function.

On power up R18 and C6 cause a delayed voltage rise to pin 9 of IC1C. This allows IC1C to prime the circuit by initially changing C8 via D6 before switching to the off state where it remains. With power down C6 will discharge rapidly through D4 so as to enable IC1C to reprime the circuit with power up. When C8 is charged above 2.5 volts IC1D's output will go high thus reverse biasing D5 allowing the amplifier IC1B to generate a voltage to apply to pin 5 of IC1A. If IC1D remains low D5 will prevent the amplifier IC1B from enabling comparator IC1A.

IC2C controls the cancel function via the control line (13) but is only operative if the output of IC1A's pin 7 is high. This makes it possible to only cancel the circuit provided the unit is actually in the alarm state. If the unit is off IC1A's output pin 7 applied to pin 9 of IC2 will be lower than pin 10 thus maintaining IC2C's output pin 8 high reverse biasing D9 preventing the discharge of C8 via D8. R32 and C10 create a delay in the voltage applied to pin 9 of IC2A.

The voltage applied to pin 10 with the control line low will be explained in conjuction with the LED oscillator IC2A. With the exception of D8, D2, D7 IC2A operates as a conventional oscillator to drive the infra red LED D3. To keep the load line current to a minimum in the off state the LED current is supplied via the control line (2). As the control line 13 varies the voltage applied to LED D3 is regulated to 3 volts by zener diode D2 and the series pass transistor T2.

On receiving the cancel signal the control line 13 to the cathode of D7 goes low eliminating reverse bias. This locks the oscillator IC2A in the on position as pin 3 of IC2A remains higher than pin 2. With T2 now with positive base drive and no collector current the voltage rise on the collector is blocked by D8 and is now developed on pin 10 of IC2C to assist the cancel operation as previously mentioned. With operation of the cancel function IC2's pin 8 goes low allowing the discharge charge of C8 through D8. With the discharge of C8 the voltage applied to pin 12 of IC1D will be lower than the voltage on pin 13 of IC1D. This will cause IC1D's pin 14 to go low reverse biasing D5 preventing IC1D from generating a voltage on pin 5 of IC1A. This will prevent the circuit from activating while IC1D's pin 14 remains low. However, immediately after the cancel function has been affected C8 will begin charge via R1 thus increasing voltage on pin 12 of IC1D so as to reactivate the circuit. The time for this to take place is dependant on the value of R1 and C8 and would normally be of a value to create a three minute cancel period.

The air flow seeder is further provided with an operational sensor prividing an output indicative of the speed of travel of the sensor over the ground. The sensor comprises a magnetic field sensor located of a similar form to that shown at FIG. 7 is adjacent a one wheel or axle of the seeder whereby a magnet is fixed to the wheel or axle of the seeder and the sensor provides an output with each pass of the magent pass the sensor. A block circuit diagram is shown at FIG. 14. The sensor is associated with a trigger circuit and timer which provides a current pulse to the control line 13. The central monitor is provided with a current sensing circuit (5) associated with the control line 13 which is able to discriminate the current pulse produced from the operational sensor from the signal and in the control line and said pulses to a programming circuit (2) which provides a count of said pulses and operates on that count to provide a signal which is a measure of the coverage effected during a seeding operation. This measure is then transferred to the hectare meter driver (1) and the hectare meter (R) of the central monitor. An example of the electrical circuit of FIG. 14 is shown at FIG. 15. The circuit utilises three integrated circuits of which one IC1 (UGN 3040T) serves as a hall effect sensor, another IC2 (LM317) serves as a regulator and the third IC3 (¼ LM324) serves as a monostable. In that circuit load line 11 supplies a regulated voltage to the sensor via voltage regulator IC2. IC1 is a magnetic hall effect sensor which will switch its output terminal 3 low when a magnet is in range. This pulse is connected to a mono stable via C2 which will drive T1 into conduction for a few milli-seconds each time a magnet passes the sensor.

When T1 conducts power flows through a resistor and indicator D2. This will cause the voltage on the anode of D3 to rise from zero to near supply voltage driving terminal 2 to a higher voltage than is normally applied to this line by the control box. This will cause IC2 at the control box to switch to the ON state which will deliver a counting pulse to the control box counting circuit. This will normally be once per revolution of a wheel or shaft and the calibration circuit will calibrate these pulses so as to give a meaningful count to be displayed by the display panel.

As a result of the embodiment a monitoring means is provided for an air seeder whereby the vital functioning characteristics of the seeder may be monitored from a central location utilising a single control line thus eliminating the need for any parallel circuitory between the central monitor and each of the sensors.

As shown at FIG. 16 the monitoring means described above may be readily applied to a conventional combine seeder.

It should be appreciated that the scope of the present invention need not be limited to the particular scope of the embodiment described above.

The claims defining the invention are as follows:

1. A monitoring means for apparatus having a number of functional stations, said means comprising a plurality of sensors located to monitor the operation of at least some of said functional stations, each sensor having a critical condition indicator adjacent the respective station for indicating at least an alarm state and a non-alarm state, a central monitor having a power supply connected via a common connection to each of the sensors and a common signal line connected to the output of each of said sensors wherein each sensor provides an output on activation of the critical condition means activated through said signal line wherin each sensor provides an output signal to said signal line for effecting the alarm means to be activated and wherein said central monitor means includes manually actuable hold switching means coupled via a common control line to each of the sensors for latching the state of each of said condition indicators.

2. A monitoring apparatus as claimed at claim 1 wherein said apparatus includes an operational sensor for providing a signal proportional to the rate of operation of at least one functional station wherein the output of said operational sensor is connected to said signal line and said central monitor is provided with a discrimination circuit capable of discriminating the output signal of said operational sensor to provide a measure of the operating characteristics of said station.

3. A monitoring apparatus as claimed at claim 1 wherein the said central monitor has means to selectively lock at least some of said sensors into an output condition which exists at any desired time.

4. A monitoring means as set forth in claim 1 in combination with an agricultural seeding apparatus having a number of seed delivery conduits, said plurality of sensors being located to monitor the flow of material through said conduits.

5. A monitoring means as claimed at claim 4 further including at least one sensor capable of sensing the operation of the seed delivery means of the seeding apparatus.

6. A monitoring means as claimed at claim 5 wherein said sensors include at least one sensor capable of sensing the amount of seed and/or fertilizer stored in the hopper of said seeder.

7. A monitoring means as claimed at claim 6 wherein said sensors include at least one sensor capable of sensing the delivery rate of seed by the seeder.

8. The monitor circuit of claim 7 wherein said alarm means further comprises a timer means for altering said alarm signal after a predetermined time interval.

9. The monitor circuit of claim 7 further comprising a control line interconnecting said central monitor and said sensor means wherein said central monitor includes a manually actuable hold switching means coupled to said control line for providing a hold signal and wherein each of said sensors includes latching circuit means responsive to said hold signal for preserving said load current flow in said indicators upon actuation of said hold switching means.

10. A monitoring means as claimed at claim 5 wherein said sensors include at least one sensor capable of sensing the delivery rate of seed by the seeder.

11. A monitoring means as claimed at claim 4, further including at least one sensor capable of sensing the amount of seed and/or fertilizer stored in the hopper of said seeder.

12. A monitoring means as claimed at claim 11 wherein said sensors include at least one sensor capable of sensing the delivery rate of seed by the seeder.

13. A monitoring means as claimed at claim 4, further including at least one sensor capable of sensing the delivery rate of seed by the seeder.

* * * * *